No. 808,488. PATENTED DEC. 26, 1905.
R. STANLEY.
COMBINED APPARATUS FOR GRINDING OR CRUSHING, WASHING, AND SEPARATING ORES.
APPLICATION FILED FEB. 10, 1905.
5 SHEETS—SHEET 5.
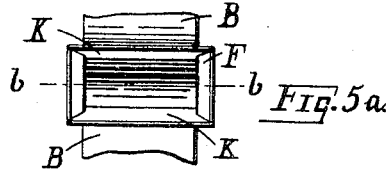
FIG. 5a.
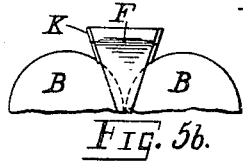 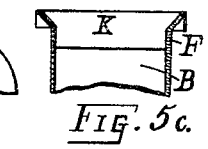
FIG. 5b.   FIG. 5c.
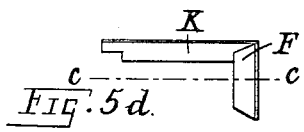
FIG. 5d.
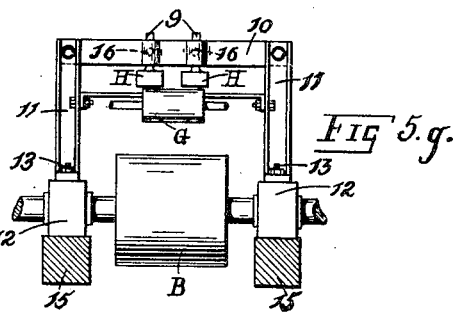
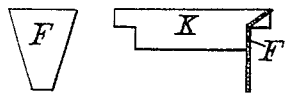
FIG. 5e.   FIG. 5f.   FIG. 5g.
FIG. 6.   FIG. 7.
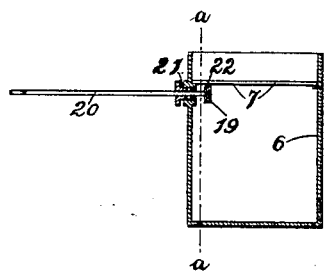 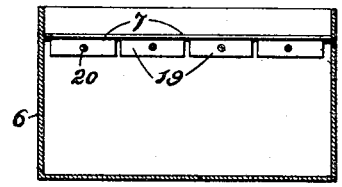
FIG. 8.   FIG. 9.
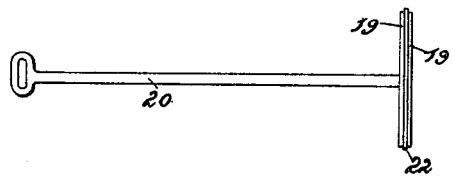 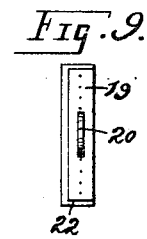
Witnesses.
U. R. Perkins
F. F. Meadows
Inventor.
R. Stanley
By Arthur H. Cantz
Attorney.

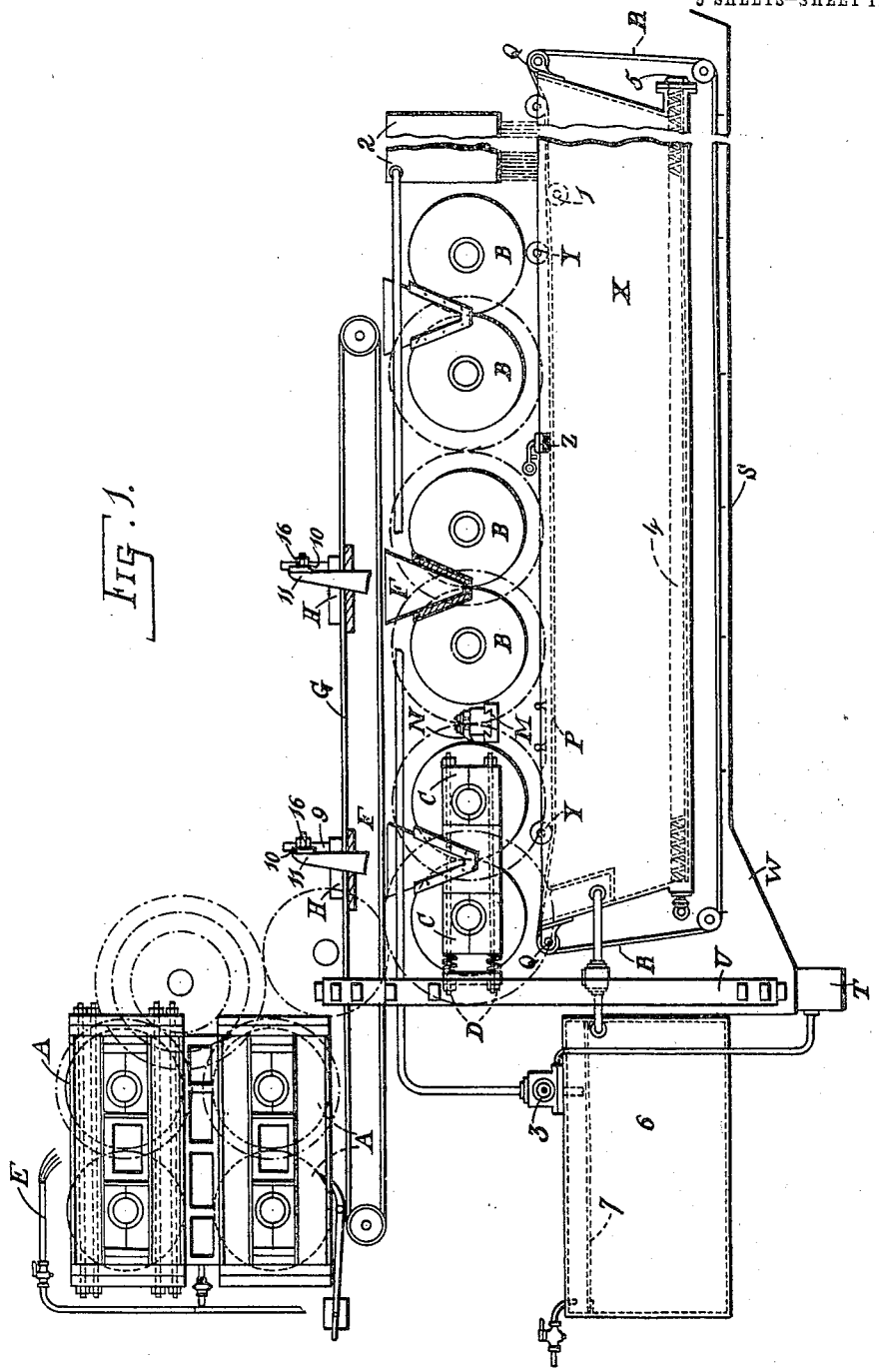

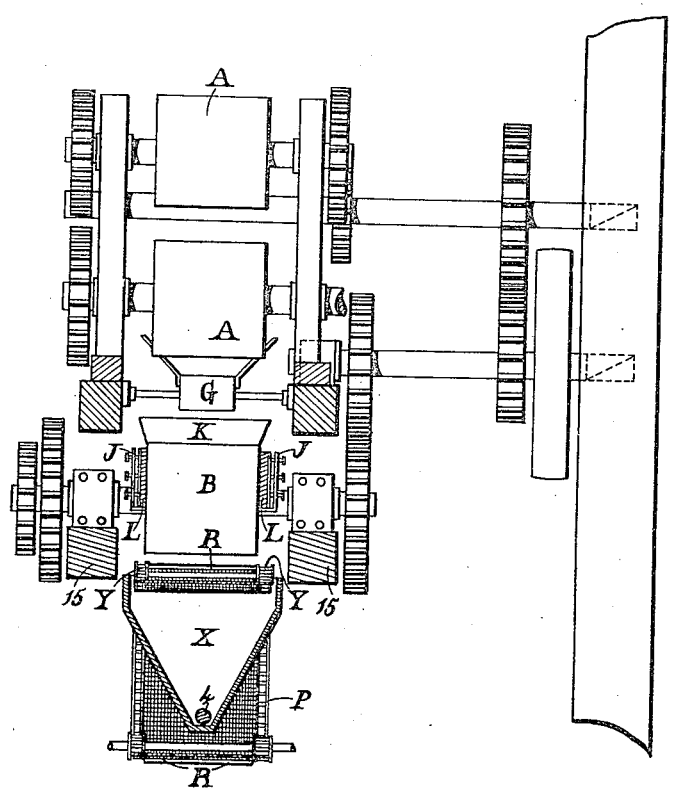

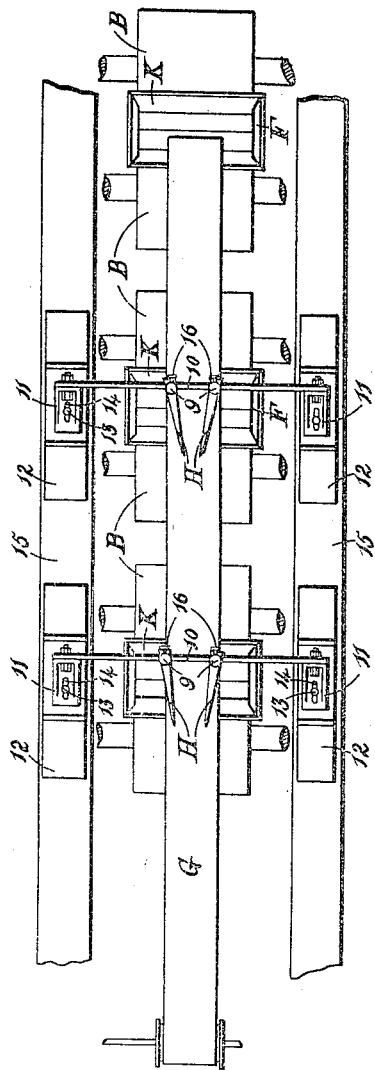

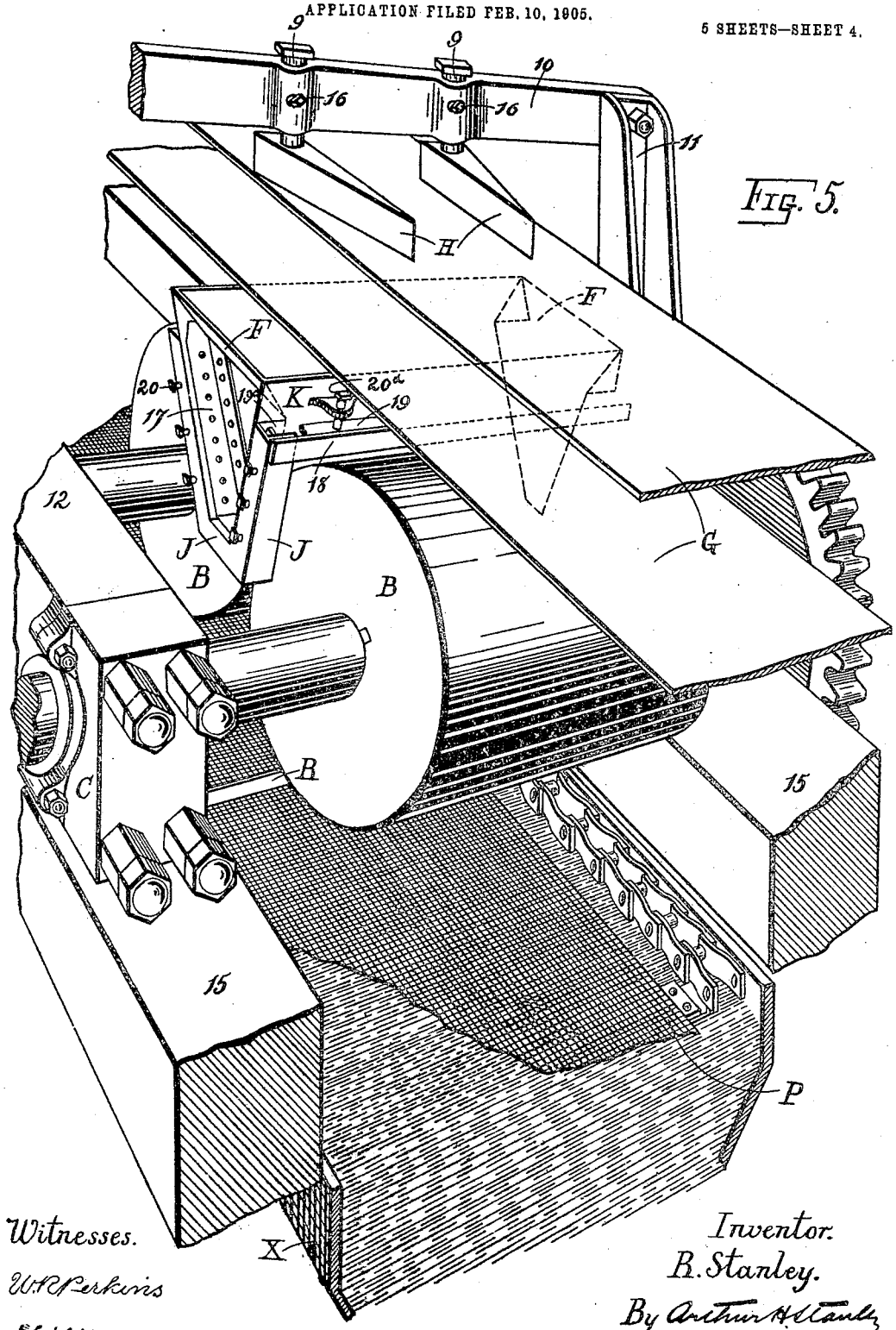

UNITED STATES PATENT OFFICE.

REGINALD STANLEY, OF NUNEATON, ENGLAND.

COMBINED APPARATUS FOR GRINDING OR CRUSHING, WASHING, AND SEPARATING ORES.

No. 808,488.

Specification of Letters Patent.

Patented Dec. 26, 1905.

Application filed February 10, 1905. Serial No. 245,058.

*To all whom it may concern:*

Be it known that I, REGINALD STANLEY, J. P., a subject of Edward, King of Great Britain and Ireland, residing at Manor Court, Nuneaton, in the county of Warwick, England, have invented certain new and useful Improvements in a Combined Apparatus for Grinding or Crushing, Washing, and Separating Ores, of which the following is a specification.

This invention relates to combined apparatus for grinding or crushing, washing, and separating ores, and especially to the type of machine known as "quartz-rolls and roller-mills" for the granulating of ores containing gold. This class of machinery has not as yet been a complete success, mainly for the reason that it has been the custom to pass both coarse and fine material to be crushed through one and the same pair of rolls, which prevented it from being reduced to a uniformly fine condition.

My present improvements provide two or more graduated pairs of rolls, the first pair or more of which may be crimped, between which the material is crushed as it passes, the first pair reducing it to a coarsely-ground condition, the others to a more finely granulated state, and so on in succession until a sufficient degree of uniform fineness in the ground material is attained so that after being passed over a sieve or sieves it is ready to be conveyed to vats or the like, where it may be treated by the cyanid or any other known process for extraction of the precious metal.

Reference will herein be made to the annexed drawings, whereon—

Figure 1 represents a quartz-mill in side elevation constructed according to my invention. Fig. 2 is an elevation of part of the mill looked at endwise. Fig. 3 is a diagram showing the water-trough in section at right angles to Fig. 1. Fig. 4 is a plan of part of the mill. Fig. 5 is a perspective view of a pair of finishing-rolls and adjacent parts of the apparatus. Figs. 5ª, 5ᵇ, and 5ᶜ are plan, end view, and section on *b b* of Fig. 5ª, respectively, of the hopper, the packing being omitted. Figs. 5ᵈ, 5ᵉ, and 5ᶠ are similar views showing a few of the plates. Fig. 5ᵍ is an end view of part of the mill, showing the traveling belt and its scrapers. Fig. 6 is a sectional end view of the reservoir hereinafter described, showing the action of its scrapers. Fig. 7 is a section on line *a a* of Fig. 6. Fig. 8 shows one of the scrapers of Fig. 6 enlarged. Fig. 9 is an end elevation of the same.

According to my said invention I mount in suitable bearings a pair or a series of rolls A A, fixed according to given gages, (hereinafter termed the "preliminary rolls,") the function of these being to reduce the material to a fineness convenient for passing between the finishing-rolls B B, the latter being mounted in bearings C C, furnished with strong springs D D, whereby the rolls are kept pressed toward each other in pairs, the rolls allowing only a thin layer of material to pass between them.

The preliminary rolls need not have springs within their bearings; but to prevent breakage by too hard substances getting between them I furnish them with strong friction brakes, drums, or clutches, which being well known I do not think it necessary to describe.

I prefer to pass the material through in as wet a condition as possible, for which purpose each pair of rollers may be provided with water-sprinklers E. In cases where water is scarce, however, I may use the material in its dry or natural state.

I find that the material if passed through in a wet or plastic condition spreads more evenly along the face of the rolls than it otherwise would, and it is therefore crushed more regularly and the rolls become worn to a more regular and straight face.

The material, which may be crushed to a given gage by stone-breakers or by crimp-rolls, is supplied to the preliminary rolls A. After passing through these rolls it falls onto a traveling belt G, which conveys the material over the hoppers of the finishing-rolls B. Means are provided for distributing the required quantity of material from the belt to each hopper. For this purpose scrapers in the form of pointed rectangular wedges H H are mounted on a cross-bar 10 above the belt G by means of round pins 9 9, to which they are attached, said pins being held within housings in the cross-bar by binding-screws 16. The cross-bar 10 is bolted to two upright standards 11 11, fixed to blocks 12 12 (which also contain the bearings of the shaft of the finishing-rolls B) by means of a bolt 13 and slot 14. The blocks 12 12 rest on beams 15 15. The wedges H are fixed with their points directed slightly inwardly along the belt and against the direction of travel, their outer edges thus sweeping the upper surface of the belt obliquely in its course and diverting a portion of the material thereon over the edges of the belt and into the hoppers below. The adjustment of the wedges H is preferably such as to equally distribute the material carried by the belt G to the several rolls B. The hoppers have converging side walls K, Figs. 5, 5ª, 5ᵇ, 5ᶜ, adapted to rest at their lower edges on the cylindrical surfaces of the rolls B, and end walls F, converging at their upper portions only and extending down as low as the center of the rolls B. The side walls K and end walls F are provided with packing-strips and stuffing-boxes, respectively. Boxes J are attached to the end walls F by means of angle-iron 17, (see Fig. 5,) while each of the side walls K is provided with a strip 18, extending across from one stuffing-box J to the other. Plates 19ª, adapted to receive pressure from screws 20ª, are combined with said strips and stuffing-boxes, as is usual. Other means for constructing these stuffing-boxes may be employed.

Each of the smooth rolls may be provided with lathe slide-rests M, attached to the frame of the mill and having cutters N and combined with gearing adapted to turn and true the faces of the rolls while they remain *in situ* either all together or several or singly.

I will now describe the manner of and apparatus for treating the crushed material after it has left the finishing-rolls.

It is found that however close together the finishing-rolls may be set it is advisable to pass the material through a sieve or sieves and to regrind the coarse product, which cannot pass through. For this purpose I provide a continuous traveling belt P, of wire gauze, underneath the finishing-rolls B, so as to catch the material falling therefrom, the belt being continued some distance beyond the last pair of rolls. The belt P may be attached to and moved by a chain along each of its edges driven by sprocket-wheels Q Q. At or near the edges of the gauze belting on the external face of same I may attach a rope or pieces of rope of spun yarn or like substance to prevent the crushed material splashing over or escaping into the tank below without passing through the gauze. I attach transverse strips R, extending across the belt from one chain to the other, such strips being preferably of thin metal, standing up an inch or more or or less. They serve not only to keep the gauze belt level, but they act as scrapers on the bottom or return portion of the belt, passing over a smooth surface S, onto which the unsifted or coarse particles fall from the belt P and driving the material before them till it falls into a sump T, whence it is lifted to the first traveling belt G, (by bucket elevator U or equivalent,) and thereby redistributed to the finishing-rolls B.

I sometimes provide that the bottom of the sump T shall contain mercury for the purpose of catching any coarse gold that does not pass through the gauze and by the admission of a jet or jets of water, steam, or air or by any mechanical power I agitate the screenings. I also provide amalgamated plates placed on the slope W, down which the screenings pass to the sump for the same purpose. Also where it is required I place amalgamated plates, over which the slimes from the trough shall pass and spread the slimes over the plates by the means of jets of water, air, or steam.

The upper traveling portion of the continuous gauze belt P is situated just above a long fairly-deep trough X of same width, and by means of guiding-wheels Y it is for the most part held down sufficiently low to be covered by water when the trough X is full of this liquid. The material passes under a hanging brush or scraper Z, which spreads it on the belt.

Pieces of wood and other light material are often sent up with the ore from the mine. In the process of crushing these get mixed and crushed with the fine material and after passing the finishing-rolls drop or become conveyed into the tank, where they are mechanically or otherwise skimmed off the surface of the water. Water is thus thoroughly mixed with the crushed material directly after it leaves the finishing-rolls and the material is raised from the water in the trough X as the belt passes over a roller 1 and is carried by the belt P underneath a shower or spray of water issuing from a perforated tank 2, fed by a water-pump 3 or in other manner at any desired pressure, the impact of this spray on the wet material resulting in a speedy separation of the finer particles, which therefore fall or are forced through the sieve-belt P and into the water-trough X, which is narrowed down at the bottom to suitable dimensions and is there fitted with a spiral conveyer 4 or conveyers adapted to carry the material toward an outlet 5 at one end, whence it is removed for cyanid or other suitable treatment.

When water is scarce and the material has been crushed in a dry state, instead of forcing the fine material through the gauze by the impact of water, as before described, I use a jet or jets of air or steam to force it through the gauze traveling belt, the fine material being collected and passed out by a worm-conveyer in the same manner as provided in the case of the slimes or fine material.

The slimy water may be drawn off from the trough X, as it is found necessary, into a reservoir 6 and pumped back into the tank 2 aforesaid by means of the pump 3. This is especially useful where water is scarce. The reservoir is divided horizontally by a very fine gauze sieve 7, through which the water ascends, leaving the slimes in the bottom of said reservoir to be removed in any convenient manner. The under surface of the sieve 7 is kept clean by means of scrapers or brushes (See Figs. 6 to 9.) Each scraper consists of a rectangular strip 22, of some suitable material, held between two smaller strips 19 of metal or the like. A handle 20 is provided, which is adapted to pass through a water-tight opening 21 in the tank 6 and is moved in and out as occasion may require, the strip 22 being kept in contact with the under surface of the sieve. The water that passes the very fine gauze just mentioned can thus be used over again in a fairly-clean condition, fresh water being added as required to make up for what is lost in the treatment or as is found necessary.

The preliminary rolls may be arranged one pair above another, and any suitable number with any required degree of fineness may be used. I prefer that the finishing-rolls should be arranged in horizontal groups, as shown in Fig. 1. They may, however, be arranged in a vertical series, the material being supplied from the belt to the first pair only and passing to the others by gravity. Sieves may be interposed between each pair and the intecepted coarser portions passed back and recrushed. In any case the finishing-rolls may rotate at a higher speed than the preliminary ones.

What I claim is—

1. Apparatus for treatment of ores, comprising rolls between which the material is reduced to a coarsely-ground condition, finishing-rolls adapted to allow only a thin layer of material to pass between them, a traveling belt of gauze underneath the finishing-rolls to catch the material falling therefrom, means of any kind for forcing the crushed material through the gauze into a trough below same, means for redistributing the material that cannot pass through the gauze to the finishing-rolls for regrinding, the whole in combination and substantially as specified.

2. Apparatus for treatment of ores, comprising rolls between which the material is reduced to a coarsely-ground condition, finishing-rolls adapted to allow only a thin layer of material to pass between them, a traveling belt of gauze underneath the finishing-rolls to catch the material falling therefrom, a trough containing water into which said belt dips, means for spraying the material as it lies on the belt after it has left the water whereby the material after being washed is separated into fine particles which fall through the gauze into the trough and means for redistributing the material that cannot pass through the gauze to the finishing-rolls for regrinding, the whole in combination and substantially as specified.

3. Apparatus for treatment of ores, comprising rolls between which the material is reduced to a coarsely-ground condition, finishing-rolls adapted to allow only a thin layer of material to pass between them, means for watering the material as it is passing between the rolls, a traveling belt of gauze underneath the finishing-rolls to catch the material falling therefrom, a trough containing water into which said belt dips, means for spraying the material as it lies on the belt after it has left the water whereby the material after being washed is separated into fine particles which fall through the gauze into the trough, and means for redistributing the material that cannot pass through the gauze to the finishing-rolls for regrinding, the whole in combination and substantially as specified.

4. Apparatus for treatment of ores, comprising rolls between which the material is reduced to a coarsely-ground condition, finishing-rolls adapted to allow only a thin layer of material to pass between them, means for conveying the material from the preliminary rolls to the finishing-rolls, means for distributing the right quantity of material to the respective finishing-rolls, a traveling belt of gauze underneath the finishing-rolls to catch the material falling therefrom, means of any kind for forcing the crushed material through the gauze into a trough below same, and means for redistributing the material that cannot pass through the gauze to the finishing-rolls for regrinding, the whole in combination and substantially as specified.

5. Apparatus for treatment of ores, comprising rolls between which the material is reduced to a coarsely-ground condition, finishing-rolls adapted to allow only a thin layer of material to pass between them, means for watering the material as it is passing between the rolls, means for assisting in retaining the material and liquid on the top of each pair of rolls, means for conveying the material from the preliminary rolls to the finishing-rolls, means for distributing the right quantity of material to the respective finishing-rolls, a traveling belt of gauze underneath the finishing-rolls to catch the material falling therefrom, means of any kind for forcing the crushed material through the gauze into a trough below same, and means for redistributing the material that cannot pass through the gauze to the finishing-rolls for regrinding, the whole in combination and substantially as specified.

6. Apparatus for treatment of ores, comprising rolls between which the material is reduced to a coarsely-ground condition, finishing-rolls adapted to allow only a thin layer of material to pass between them, means for watering the material as it is passing between the rolls, means for assisting in retaining the material and liquid on the top of each pair of rolls, means for conveying the material from the preliminary rolls to the finishing-rolls, means for distributing the right quantity of material to the respective finishing-rolls, a traveling belt of gauze underneath the finishing-rolls to catch the material falling therefrom, a trough containing water into which said belt dips, means for spraying the material as it lies on the belt after it has left the water whereby the material after being washed is separated into fine particles which fall through the gauze into the trough, and means for redistributing the material that cannot pass through the gauze to the finishing-rolls for regrinding, the whole in combination and substantially as specified.

In witness whereof I have hereunto set my hand, in the presence of two witnesses, this 10th day of December, 1904.

REGINALD STANLEY.

Witnesses:
WILLIAM HERBERT WHITEHEAD,
SUSAN JENKIN BROADBENT.